UNITED STATES PATENT OFFICE.

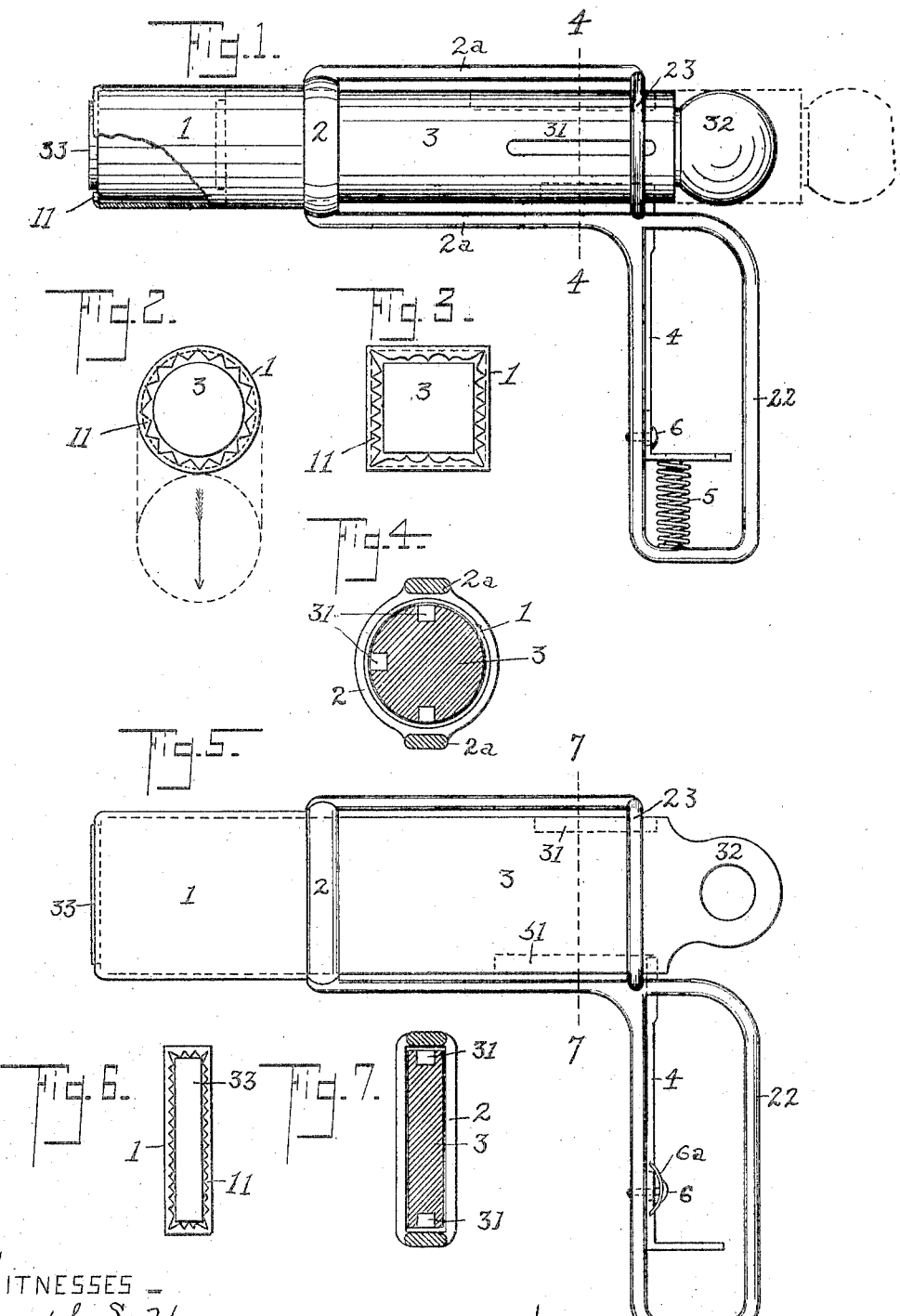

ARTHUR ROGERS SELDEN, OF ROCHESTER, NEW YORK.

BUTTER-CUTTER.

No. 797,379.          Specification of Letters Patent.          Patented Aug. 15, 1905.

Application filed December 10, 1901. Serial No. 85,352.

*To all whom it may concern:*

Be it known that I, ARTHUR ROGERS SELDEN, a citizen of the United States, residing at Rochester, county of Monroe, and State of New York, have invented a certain new and useful Improvement in Butter-Cutters, of which a full description is contained in the following specification and drawings.

The object of my invention is to provide a quick and easy way to make butter balls, or, as they are sometimes called, "butter patties," for table use.

In the accompanying drawings, Figure 1 is a side view of one form of improved butter-cutter. Fig. 2 is an end view of the cutter part of Fig. 1. Fig. 3 is an end view of a modified form. Fig. 4 is a section on dotted line 4 4 of cutter. Fig. 5 is a side view of another form of butter-cutter. Fig. 6 is an end view of the cutter shown in Fig. 5, and Fig. 7 is a section on the dotted line 7 7 of Fig. 5.

In the drawings, 1 represents a thin metal tube, whose end is represented as turned in upon itself, so that the size of the opening at the end is decreased and the inwardly-turned part cut into flutes or teeth, as represented at 11 in Figs. 1 and 2. When this tube 1 is pressed downward into a piece of butter, a cylinder of butter the size of its fluted opening is formed within said tube, and this cylinder will be fluted as the butter is forced into the tube through the fluted end. The points only of the flutes on the butter in the tube come in contact with the inner surface of the tube, leaving an air-space around it which aids in operating on the butter, including reduction of contact between the butter and the tube and the formation of the contour of the mass when forced out of the tube, and this is the fact when the tube is pressed into a mass of butter. It is evident that if the tube 1 is pressed into the butter a short distance and then withdrawn the fluted cylinder of butter formed within the tube will remain attached to the main piece of butter instead of being withdrawn with the tube. If, however, the tube 1 is pressed clear through the main piece of butter until it strikes the receptacle in which the butter is contained, the connection between the main piece of butter and the cylinder within the tube will be severed and the cylinder of butter will be retained in the tube 1 when the latter is withdrawn. Inasmuch as it rarely happens that the piece of butter from which the patties are to be made has just the right depth to make the patties in this way, some way must be devised for cutting the cylinder of butter from the main piece at a uniform depth. This is done by moving the tube 1 horizontally when sunk in the butter to the right depth, as indicated by the arrow and the dotted lines in Fig. 2. To provide for cutting off the patties at a uniform length, I provide a plunger 3, which fits loosely in the tube 1, and means for limiting the withdrawal of the plunger from the tube, as described below. The plunger is represented as having a reduced end 33, which passes through the fluted end of the tube 1 and projects beyond the same in order to force the removal of the fluted cylinder of butter clear out of the tube. The tube 1 is supported with a frame comprised of the lower ring 2, to which the tube is soldered or otherwise secured, and the upper ring 23, connected by the side bars $2^a$, which affords a guide for the plunger 3, through which said plunger is guided vertically into the tube 1. A handle 22 is secured to the frame at right angles, as shown in Figs. 1 and 5.

Within handle 22 I place a spring-bolt 4, which passes through one of the side bars $2^a$ of frame 2 and projects into the space occupied by plunger 3. The other end of this bolt is fastened to the handle 22, as by the rivet 6, which passes through a slotted hole in said bolt 4, which hole is long enough to allow the withdrawal of the bolt 4 from the space occupied by the plunger 3. A spring 5 is placed between the end of handle 22 and bolt 4, as shown in Fig. 1, to normally keep the bolt 4 within the space occupied by plunger 3. I provide lugs on handle 22 and bolt 4 to keep the spring 5 in place. A modified form of fastening for bolt 4 is shown in Fig. 5, in which a spring-washer $6^a$ is inserted between rivet 6 and bolt 4. In this construction the bolt 4 can be easily moved backward and forward and will stay in either position, being held by the friction of washer $6^a$. The corners of the washer $6^a$ are turned downward on the sides of bolt 4 to prevent its turning out of place.

Plunger 3 has slots 31 31 31 of different lengths, into one of which the bolt 4 projects and limits the motion of the plunger, thus determining the length of the fluted cylinder of butter, as hereinafter described. The slots 31 31 are placed at different points around the plunger, and their upper ends terminate in the same place across the plunger.

Fig. 3 shows a square form of the tube 1, which may be used in the same manner as the circular just described; but in this form the frame and plunger must be made square to fit the tube 1. In Fig. 5 I show still another form of the tube 1, which will make a butter ball or patty of a flat form fluted on four of its six sides. Besides the three forms shown in Figs. 3, 4, and 6 others may be used equally well, and I do not limit myself to the forms shown. The tube 1 may be fluted its entire length instead of having flutes on its end only; but it is not essential that the tube should be fluted or that its end should be turned in as represented. I prefer, however, construction shown and described above. The tube 1 may be of the same length as the plunger 3 and the handle 22 may be fastened to its side, in which case the bolt 4 is passed through the tube near its upper end; but I prefer the form shown, because it can more easily be kept clean.

The operation of this butter-cutter is as follows: Suppose that it is necessary to make butter balls or patties out of butter that is packed in a crock and that the top of the butter is level. First, a hole is made in the butter, so that the side motion shown in dotted lines in Fig. 2 can be made in order to sever the fluted cylinder of butter in the tube from the main body of butter in the crock. This is done by forcing the tube down into the butter in the crock to the depth desired, while the plunger is held down in the tube by the thumb on its head 32, so that the butter cannot enter the tube 1, and then withdrawing the tube. The tube 1 is again forced down into the butter at one side of the hole made by the first operation, and this time the plunger 3 is allowed to rest on the butter in the tube 1, while the other parts of the butter-cutter have a downward motion until the bolt 4 comes in contact with the end of that slot 31 which is then in use. Next the tube is moved sidewise, as shown in Fig. 2, when the butter in the tube is severed from the main body of the butter, so that it remains in the tube and can be withdrawn with it. The fluted cylinder of butter that is retained in the tube may be forced out by a downward motion of the plunger in the tube. This operation may be continued until one layer of the butter in the crock is removed to the depth of fluted cylinder, when the operation may be commenced over again and another layer removed in like manner. When patties are cut from a roll of butter, it is not necessary to make a hole in the butter in the first place, for the operation may be commenced at one corner of the roll.

I claim—

1. In a butter-cutter having a longitudinal tube, a plunger, a groove in its side, and a bolt fastened to a frame fastened rigidly to the tube, the bolt adapted to extend into said groove for limiting the movement of the said plunger.

2. In a butter-cutter, a tube, a frame fastened rigidly to the tube a plunger within the tube, having a longitudinal groove, and a movable bolt fastened to the frame and adapted to project into said groove for limiting the movement of the plunger.

3. In a butter-cutter a tube, a frame fastened rigidly to the tube a plunger within the tube, having a series of longitudinal grooves of varying length and a movable bolt supported by the frame and adapted to project into any one of the grooves of the said plunger whereby the movement of said plunger is limited for different strokes.

4. In a butter-cutter, a tube having inwardly-projecting teeth at its lower end, a plunger fitting within the tube, and adapted to move longitudinally therein; a frame secured to the tube, and affording a guide for the plunger; a handle attached to the frame; and a spring-actuated bolt attached to the frame and adapted to limit the motion of the plunger by engaging therewith.

5. In a butter-cutter, a tube having its lower end reduced in size and provided with inwardly-projecting teeth, a frame rigidly attached to the tube having a centrally-located guide of the same internal diameter as the tube, a plunger of the same diameter throughout its guiding-surfaces and having an extension on its lower end of smaller diameter than the circle formed by the inward points of the teeth on the lower end of the tube and of a length sufficient to project beyond the lower end of the tube when the plunger is at its extreme point of movement.

6. In a butter-cutter, the combination of a tube having parallel sides and inwardly-projecting teeth on its extremity, a frame fastened rigidly to the tube; having a centrally-located guide of the same internal diameter as the tube; and a plunger fitting in said tube and guide of the same diameter throughout its guiding-surfaces, substantially as shown and described.

ARTHUR ROGERS SELDEN.

Witnesses:
 JOSEPH S. HUNN,
 W. D. ELLWANGER.